(12) United States Patent
Hirose

(10) Patent No.: US 8,930,450 B2
(45) Date of Patent: Jan. 6, 2015

(54) INFORMATION PROCESSING APPARATUS, AND CONTROL METHOD AND STORAGE MEDIUM THEREFOR

(75) Inventor: Fumiaki Hirose, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/569,320

(22) Filed: Sep. 29, 2009

(65) Prior Publication Data

US 2010/0088375 A1   Apr. 8, 2010

(30) Foreign Application Priority Data

Oct. 2, 2008   (JP) ................................. 2008-257785

(51) Int. Cl.
*G06F 15/16* (2006.01)
*G06F 9/50* (2006.01)

(52) U.S. Cl.
CPC .................................. *G06F 9/5027* (2013.01)
USPC ............ 709/204; 709/223; 358/2.1; 358/1.15

(58) Field of Classification Search
USPC .................................. 709/204, 223, 224, 206
See application file for complete search history.

(56) References Cited

U.S. PATENT DOCUMENTS

| | | | |
|---|---|---|---|
| 2006/0007480 A1* | 1/2006 | Yokokura | 358/1.15 |
| 2006/0077448 A1* | 4/2006 | Plewnia et al. | 358/1.15 |
| 2009/0089802 A1* | 4/2009 | Wang et al. | 719/318 |

FOREIGN PATENT DOCUMENTS

| | | |
|---|---|---|
| JP | 2001-356853 A | 12/2001 |
| JP | 2005158047 A | 6/2005 |
| JP | 2005-258794 A | 9/2005 |

OTHER PUBLICATIONS

JP Office Action issued Dec. 3, 2012 for corresponding JP2008-257785.

* cited by examiner

*Primary Examiner* — Liangche A Wang
*Assistant Examiner* — Cheikh Ndiaye
(74) *Attorney, Agent, or Firm* — Rossi, Kimms & McDowell LLP

(57) ABSTRACT

An information processing apparatus configured to notify information on processing in a notification method different depending on whether the processing to be executed by a processing unit is one executed in response to a request from a web application accessed by the apparatus. The information processing apparatus registers identification information for the web application accessed by the apparatus, and determines whether a job to be executed by the apparatus is one requested by a web application corresponding to any of registered identification information. When it is determined that the job is one requested by a web application corresponding to any of the registered identification information, the progress of the job is displayed in detail. When it is determined that the job is not one requested by a web application corresponding to any of the registered identification information, the progress of the job is briefly displayed or is not displayed.

9 Claims, 11 Drawing Sheets

| ID | NETWORK ADDRESS |
|---|---|
| 1 | 111.22.333.444 |
| 2 | 121.33.456.78 |
| ... | ... |
|  |  |

US 8,930,450 B2

INFORMATION PROCESSING APPARATUS, AND CONTROL METHOD AND STORAGE MEDIUM THEREFOR

BACKGROUND OF THE INVENTION

1. Field of the Invention

The present invention relates to an information processing apparatus that executes processing requested by a web application provided on an external apparatus, and relates to a control method for the information processing apparatus and a storage medium for executing the method.

2. Description of the Related Art

In internet-related fields, it has recently been known to access via a web browser a web application provided on an external apparatus (e.g., web server) on the Internet, to thereby utilize a service offered by the web application.

FIG. 15 shows operations performed to utilize via a web browser a service offered by a web application provided on a web server.

In step S1501, the web browser accesses the web server and requests the web application on the web server to execute processing. In step S1502, the web application executes the requested processing.

In step S1503, the web application notifies an execution result of the processing to the web browser. In step S1504, the web browser updates a browser display screen to report the notified processing result to a user.

Also, there has recently been known a system in which when receiving a request for processing from a web browser, a web application on a web server requests other apparatus than the web server to execute the processing.

In an example shown in FIG. 16, a web browser requests a web application on a web server to execute processing (step S1601).

The web application receiving the request from the web browser executes the requested processing (step S1602), and requests another apparatus, e.g., a printer, to execute print processing (step S1603).

The printer receiving the request from the web application executes the requested print processing (step S1604), and notifies a print processing result to the requestor web application (step S1605). In step S1606, the web application notifies the print processing result notified from the printer to the web browser that first requests execution of the processing.

As described above, the method shown in FIG. 16 enables the web application to utilize processing means provided in another apparatus, thereby expanding a range of services which the web application can offer. It is also possible to notify a processing result to a web browser user by notifying the result of processing performed by the processing means (the printer in the example of FIG. 16) of the other apparatus to the web browser that first requests execution of the processing.

Another method for notifying a result of processing executed by a printer or other processing means to a user is known, e.g., from Japanese Laid-open Patent Publication No. 2001-356853.

Japanese Laid-open Patent Publication No. 2001-356853 discloses monitoring states of image processing jobs, which are being executed by processing means (printer or scanner) of an image processing apparatus, and causing an operation unit of the image processing apparatus to display operation statuses of the processing means.

As described above with reference to FIG. 16, even when processing is executed by a web application by utilizing processing means of another apparatus, it is necessary to notify a result of processing executed by the processing means to a requestor user. In that case, however, the result of the processing executed by the processing means of the other apparatus is notified to the requestor via the web server, and the realtimeness is therefore lowered in some cases.

Especially, in a case that both a requestor web browser and a printer (processing means of another apparatus utilized by a web application) are provided in one information processing apparatus, it is inefficient to notify via the web server a result of print processing performed by the printer.

FIG. 17 shows a conventional arrangement to notify a result of print processing executed by a printer of an information processing apparatus having therein both a requestor web browser and the printer serving as processing means of another apparatus utilized by a web application.

Reference numeral 1701 denotes an MFP (multi function peripheral) as the information processing apparatus, and 1702 denotes a web server connected with the MFP 1701 via a network. The MFP 1701 includes an operation unit 1703 for displaying, e.g., the progress of processing which is being executed by the MFP, a control unit 1704 for controlling the entire MFP 1701, and a printer 1705 for executing requested processing. The web server 1702 includes a RAM 1706, a web application 1707, and a LAN I/F 1708 for exchanging information with the MFP 1701.

The following is a description of control for causing the operation unit 1703 to display, e.g., the progress of processing which is being executed by the MFP 1701. First, the printer 1705 notifies an event to the control unit 1704, as shown at reference numeral 1711. The control unit 1704 notifies the received event to the web application 1707, as shown at 1712.

In the web application 1707, various events which are able to take place in the MFP 1701 are managed in correspondence with drawing data to be displayed by the web browser. As shown at reference numeral 1713, the web application 1707 creates drawing data in accordance with the content of the event notified from the MFP 1701. The web server 1702 then transmits the drawing data created by the web application 1707 to the MFP 1701, as shown at reference numeral 1714. Finally, as shown at 1715, the MFP 1701 updates a web browser display based on the received drawing data.

As described above, heretofore, the information processing apparatus takes the trouble to transmit and receive a result of its own processing to and from the web server via the network even simply to notify the processing result to an apparatus user, resulting in problems that the realtimeness is lowered and network traffic increases.

It is considered that a processing result may be notified to the user by using the method disclosed in Japanese Laid-open Patent Publication No. 2001-356853 in a case that processing is executed in response to a request from a web application, as with the case where processing is executed in response to a request from a local application provided on the information processing apparatus. Specifically, it is considered that irrespective of whether the processing is executed in response to a request from the local application or from the web application, the processing result may be notified to the user without the intervention of the web server.

In that case, however, the processing result is notified, without discriminating whether the processing is executed in response to a request from the local application on the information processing apparatus or from the web application. Thus, there is a fear that the following problems are posed.

Specifically, when a user A currently operating the information processing apparatus accesses the web application via the web browser, there is a fear that a result of processing executed in accordance with instructions given by another user B other than the user A is notified to the user A. In that case, the user A notified of the processing result is confused since the user A cannot easily identify whether the notified processing result is one for the processing executed according to instructions given by the user A or given by another user.

It should be noted that the processing executed according to instructions from the user B includes, e.g., processing executed by the printer of the information processing apparatus in accordance with instructions given from the user B by remote operation to the local application on the information processing apparatus, and processing whose execution is requested to the printer of the information processing apparatus from a web application to which the execution of the processing is requested by the user B via another information processing apparatus.

As described above, processing means such as a printer provided in an information processing apparatus is not only able to execute processing in response to a request, from a web application, based on instructions given by a user currently operating the information processing apparatus, but also able to execute processing in accordance with various requests. As a result, the above described problems can be caused.

SUMMARY OF THE INVENTION

The present invention provides an information processing apparatus capable of notifying information on processing in a notification method different depending on whether the processing is one executed in response to a request from a web application accessed from the information processing apparatus, and provides a control method for the information processing apparatus and a storage medium for executing the control method.

According to a first aspect of this invention, there is provided an information processing apparatus having a processing unit configured to communicate with an external apparatus which is connected via a network to the information processing apparatus and to execute processing in response to a request from any of at least one web application provided on the external apparatus, comprising an access unit configured to access any of the at least one web application provided on the external apparatus, a determination unit configured to determine whether processing to be executed by the processing unit is one executed in response to a request from any of the at least one web application accessed by said access unit, a selection unit configured to select a notification method different depending on whether it is determined by the determination unit that the processing to be executed by the processing unit is one executed in response to a request from any of the at least one web application accessed by said access unit, and a notification unit configured to notify information on the processing having been or being executed by the processing unit in the notification method selected by the selection unit.

According to a second aspect of this invention, there is provided an information processing apparatus having a processing unit configured to communicate with an external apparatus which is connected via a network to the information processing apparatus and to execute processing in response to a request from any of at least one web application provided on the external apparatus, comprising an access unit configured to access any of the at least one web application provided on the external apparatus, a determination unit configured to determine whether processing to be executed by the processing unit is one executed in response to a request from any of the at least one web application accessed by said access unit, and a notification unit configured to notify information on the processing having been or being executed by the processing unit in a case where it is determined by the determination unit that the processing to be executed by the processing unit is one executed in response to a request from any of the at least one web application accessed by said access unit.

According to third and fourth aspects of this invention, there are provided control methods for the information processing apparatuses according to the first and second aspects of this invention.

According to fifth and sixth aspects of this invention, there are provided computer-readable storage media each storing a program for causing a computer to execute a corresponding one of the control methods according to the third and fourth aspects of this invention.

With the present invention, it is possible to provide an arrangement capable of notifying information on processing in a notification method different depending on whether the processing is one executed in response to a request from a web application accessed from an information processing apparatus.

Further features of the present invention will become apparent from the following description of an exemplary embodiment with reference to the attached drawings.

DETAILED DESCRIPTION OF THE PREFERRED EMBODIMENT

Figure 1:
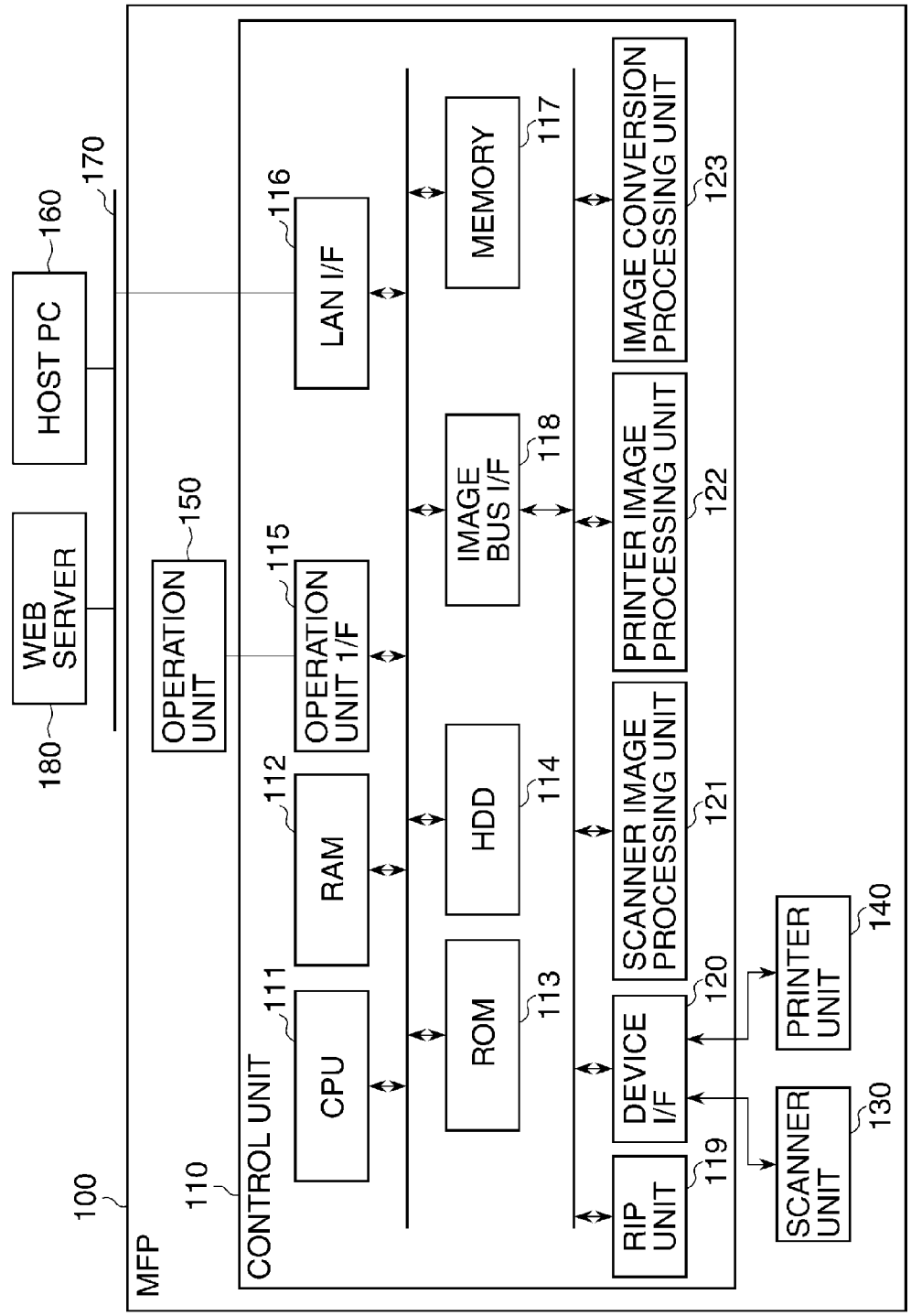
FIG. 1 is a block diagram showing an example construction of an information processing apparatus according to one embodiment of this invention.

In the following, one embodiment of the present invention will be described with reference to FIGS. 1 to 14. FIG. 1 shows in block diagram an example construction of an information processing apparatus of the embodiment. Hereinafter, an MFP 100 will be described as an example of the information processing apparatus, but this is not limitative. This invention is applicable to any other information processing apparatus connectable to a network, such as a printer or a facsimile machine.

The MFP 100 includes a control unit 110, scanner unit 130, printer unit 140, and operation unit 150. The control unit 110 includes a CPU 111, RAM 112, ROM 113, HDD 114, operation unit I/F 115, LAN I/F 116, memory 117, and image bus I/F 118. The control unit 110 further includes an RIP unit 119, device I/F 120, scanner image processing unit 121, printer image processing unit 122, and image conversion processing unit 123. The scanner unit 130 is an image input device that reads an image of an original. The printer unit 140 is an image output device that forms an image onto a recording medium based on image data.

The control unit 110 is connected with the scanner unit 130 and the printer unit 140, and controls input and output of image information. The control unit 110 is also connected with a LAN 170, and controls input and output of image information such as video data or still image data received from a web server 180 or a host PC 160, device information, and other information.

The CPU 111 controls overall operation of the MFP 100. Specifically, the CPU 111 loads into the RAM 112 a program stored in the ROM 113 or the HDD 114, and executes the program to perform various control. The RAM 112 also functions as an image memory that temporarily stores image data. The ROM 113 is a boot ROM that stores a system boot program. The HDD (hard disk drive) 114 stores system software, image data, a program for control of operation of the MFP 100, etc.

The operation unit I/F 115 is an interface to connect the operation unit 150 with the control unit 110. The operation unit I/F 115 outputs to the operation unit 150 image data to be displayed on the operation unit 150, and conveys to the CPU 111 information which is input by a user via the operation unit 150.

The LAN I/F 116 is connected to the LAN 170 and controls input and output of information from and to external apparatuses connected to the LAN 170. The LAN I/F 116 is an example means for accessing a web application provided on a web server on the Internet. The memory 117 stores still image data and other data, as with the HDD 114. It should be noted that the memory 117 may be implemented by a removable external storage device. The image bus I/F 118 controls high-speed input and output of image data from and to an image bus.

The RIP (raster image processor) unit 119 receives PDL from the host PC 160 via the LAN 170 and the LAN I/F 116 and develops the PDL into bit map image. The device I/F 120 connects the control unit 110 with the scanner unit 130 and the printer unit 140 which are image input and output devices, and performs synchronous/asynchronous conversion of image data.

The scanner image processing unit 121 performs image processing on image data of an original read by the scanner unit 130. The printer image processing unit 122 performs image processing on image data to be output to the printer unit 140. The image conversion processing unit 123 performs image conversion on image data stored in the RAM 112. Specifically, the image conversion processing unit 123 performs rotation processing, resolution conversion, or other processing on the image data. Also, the unit 123 converts binary image into multi-valued image, and converts multi-valued image into binary image.

Figure 2:
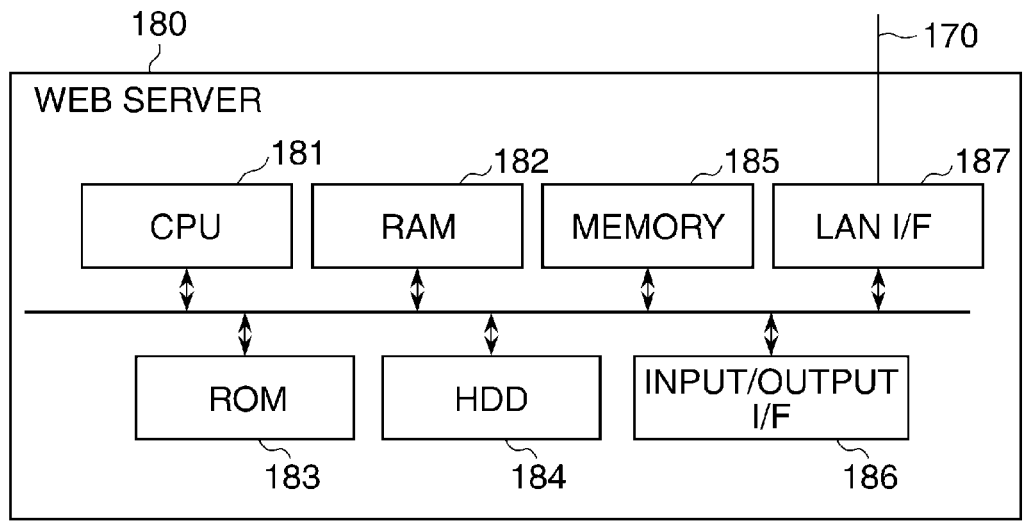
FIG. 2 is a block diagram showing an example construction of a web server shown in FIG. 1.

Next, the web server 180 is described with reference to FIG. 2. FIG. 2 shows in block diagram an example construction of the web server 180.

The web server 180 includes a CPU 181, RAM 182, ROM 183, HDD 184, memory 185, input/output I/F 186, and LAN I/F 187. The CPU 181 controls overall operation of the web server 180. Specifically, the CPU 181 loads into the RAM 182 a program stored in the ROM 183 or the HDD 184, and executes the program to carry out various control. The ROM 183 is a boot ROM that stores a system boot program. The HDD 184 stores system software, a program for controlling the operation of the web server 180, etc.

As with the HDD 184, the memory 185 stores various data. It should be noted that the memory 185 may be implemented by, e.g., a removable external storage device. The input/output I/F 186 is an interface for connecting the web server 180 with input/output devices such as mouse, keyboard, and monitor. The LAN I/F 187 is connected with the LAN 170 and controls input and output of various information.

Figure 3:
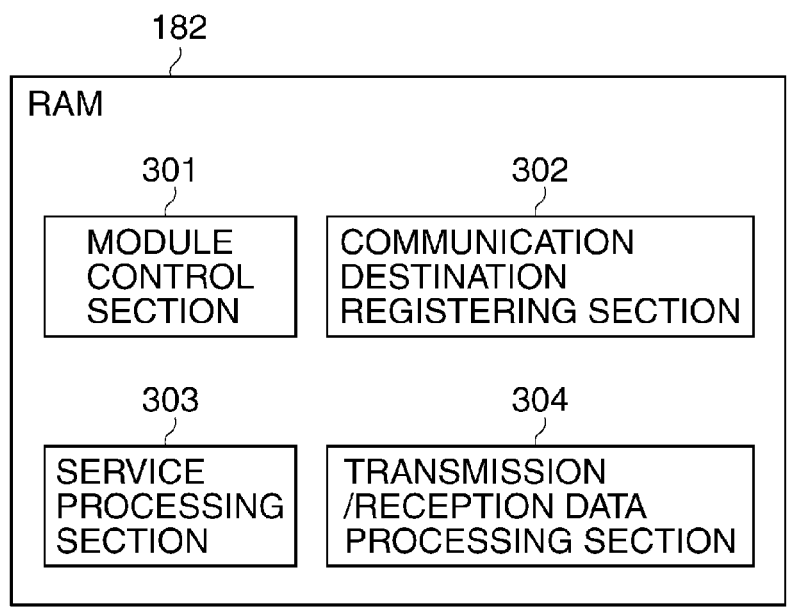
FIG. 3 is a block diagram showing an example functional construction of an application developed on a RAM of the web server.

Next, with reference to FIG. 3, a description is given of the functional construction of an application executed on the web server 180. The web server 180 is an external apparatus connected with the information processing apparatus (MFP 100) via the network. FIG. 3 shows in block diagram an example functional construction of the application developed on the RAM 182 of the web server 180. In the following, blocks (modules) of the application which mainly relate to this embodiment are described. The application can be configured to include other blocks.

The web application that offers a service executed by the web server 180 includes a module control section 301, communication destination registering section 302, service processing section 303, and transmission/reception data processing section 304. The module control section 301 overall controls the respective modules of the web application. The communication destination registering section 302 registers network information representing, e.g., an IP address of another apparatus that is utilized by the web application to offer the service. The service processing section 303 executes processing to offer the service. The transmission/reception data processing section 304 performs processing to convert data received from the communication destination into one which can be processed by the service processing section 303 and convert data created by the service processing section 303 into one which can be transmitted to the communication destination.

Figure 4:
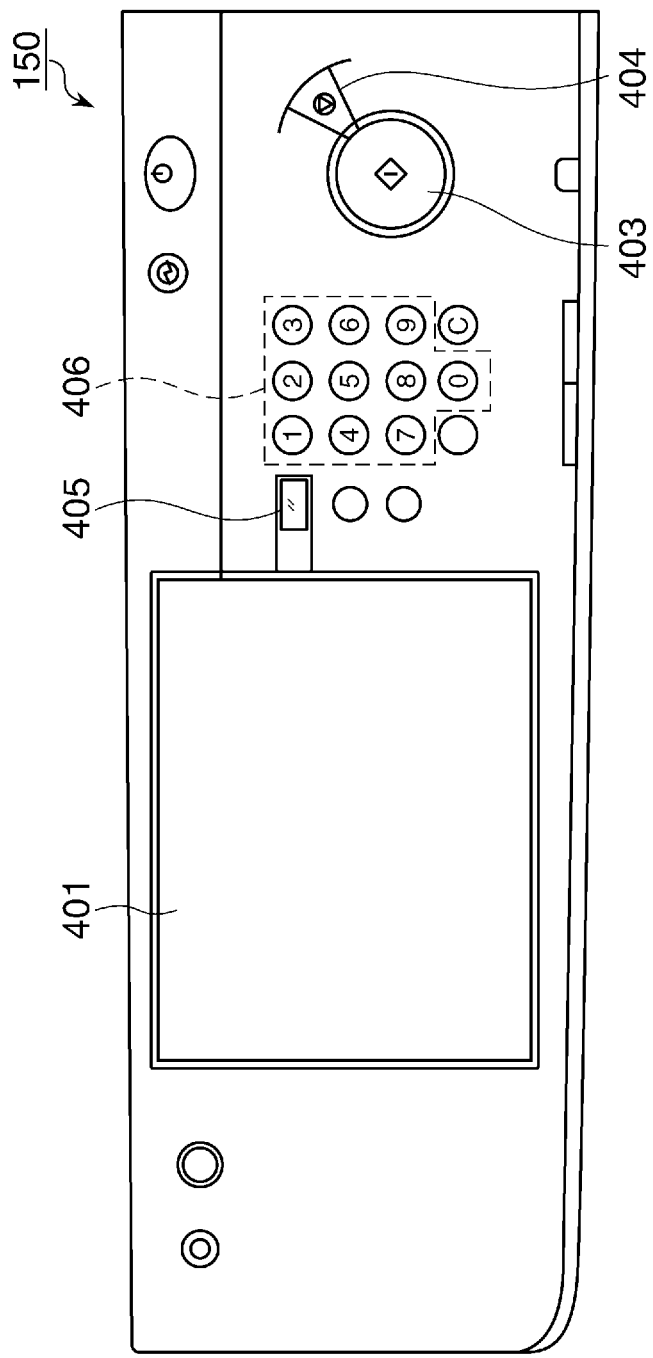
FIG. 4 is an external view of an operation unit of an MFP shown in FIG. 1.

Next, the operation unit 150 of the MFP 100 is described with reference to FIG. 4. FIG. 4 shows an external appearance of the operation unit 150. The operation unit 150 includes a liquid crystal operation panel 401, start key 403, stop key 404, reset key 405, and ten keys 406.

The liquid crystal operation panel 401, which is implemented by a liquid crystal display device with touch panel sheet, displays an operation screen for various settings and displays input setting information. The operation panel 401 is also able to display a preview of still image data stored in the HDD 114. When an instruction is input by the user via the touch panel, positional information representing a place touched by the user is detected, and the content of the instruction is delivered via the operation unit I/F 115 to the CPU 111.

The start key 403 is a hard key for instructing the scanner unit 130 to start a reading operation and instructing the printer unit 140 to start a printing operation. The start key 403 has a green LED and a red LED incorporated therein. The green LED is lit when the MFP 100 is in a state ready to start the operation, whereas the red LED is lit when the MFP 100 is in a state unable to start the operation due to, e.g., error.

The stop key 404 is a hard key to instruct to stop the operation, the reset key 405 is a hard key to return various settings to their initial values, and the ten keys 406 are hard keys to directly input the number of copies and the magnification ratio.

Figure 5:
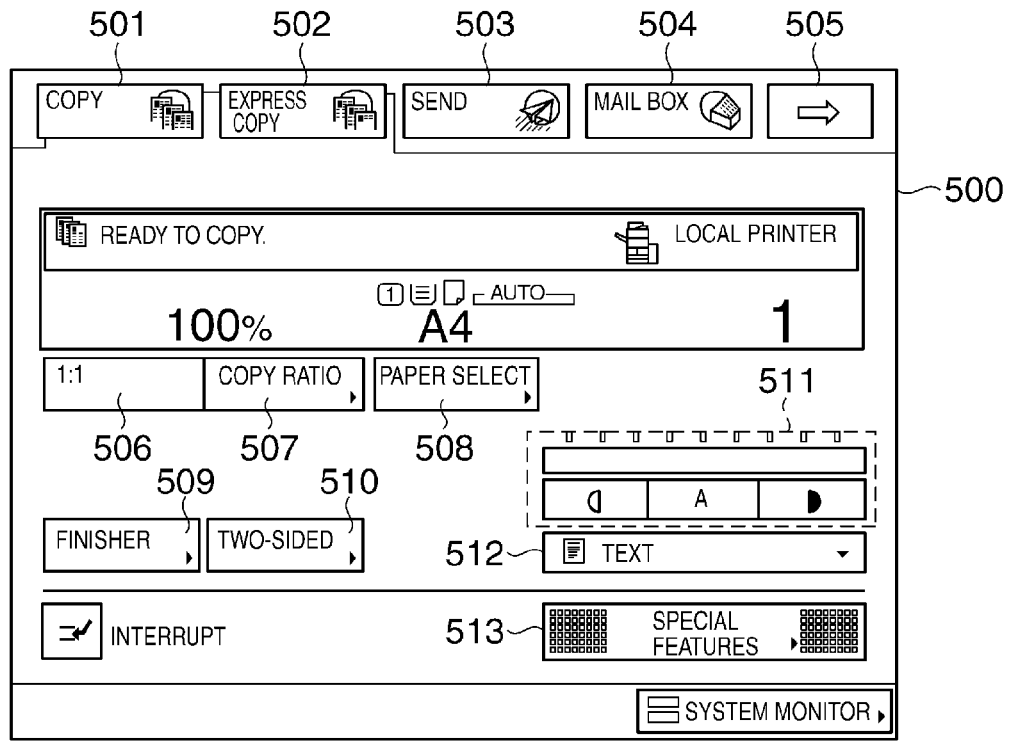
FIG. 5 is a view showing an example operation screen of the MFP.

Next, an operation screen displayed on the liquid crystal operation panel 401 is described with reference to FIG. 5. FIG. 5 shows an example operation screen. The operation screen 500 shown in FIG. 5 is a COPY basic screen, which is displayed as a default screen when the power supply to the MFP 100 is turned on.

As functions offered to a user, the MFP 100 comprises five modes, i.e., COPY mode, SEND mode, BOX mode, SCAN mode, and WEB browsing mode. The COPY mode is a mode for copy operation, in which an image of an original is read and input by the scanner unit 130 and the image is print output by the printer unit 140. The SEND mode is a mode in which image data input from the scanner unit 130 or stored beforehand in the HDD 114 is transmitted in the form of, e.g., e-mail to the destination via the LAN 170 or the Internet.

The BOX mode is a mode in which various data stored in a box is processed (edited, printed, transmitted, etc.). It should be noted that the box indicates a user box or a storage area on the HDD 114 assigned to each individual user. The SCAN mode is a mode in which an image of an original is read and input by the scanner unit 130 and stored into a box or transmitted to the host PC 160 via the LAN 170.

The WEB browsing mode is a mode in which the web server 180 is accessed via the LAN 170 and a web page provided by the web server is browsed or various services provided by web applications on the web server are utilized.

Switching between modes other than the SCAN mode and the WEB browsing mode can be made by selecting a desired one of mode buttons 501 to 504 shown in FIG. 5. It should be noted that switching between the SCAN mode and the WEB browsing mode can be made, e.g., by selecting a desired one of mode buttons displayed when a button 505 is selected.

In the example in FIG. 5, there is shown a state where a COPY mode screen is selected. By using buttons 506 to 512 displayed on the COPY mode screen, the user is able to set equimagnification, expansion/reduction, sheet size selection, finishing designation, double-sided/single-sided designation, density designation, and text/photo designation. When a button 513 is selected, a more detailed setting menu is displayed, whereby the user is able to make more detailed settings than the settings by the buttons 506 to 512.

Figure 6:
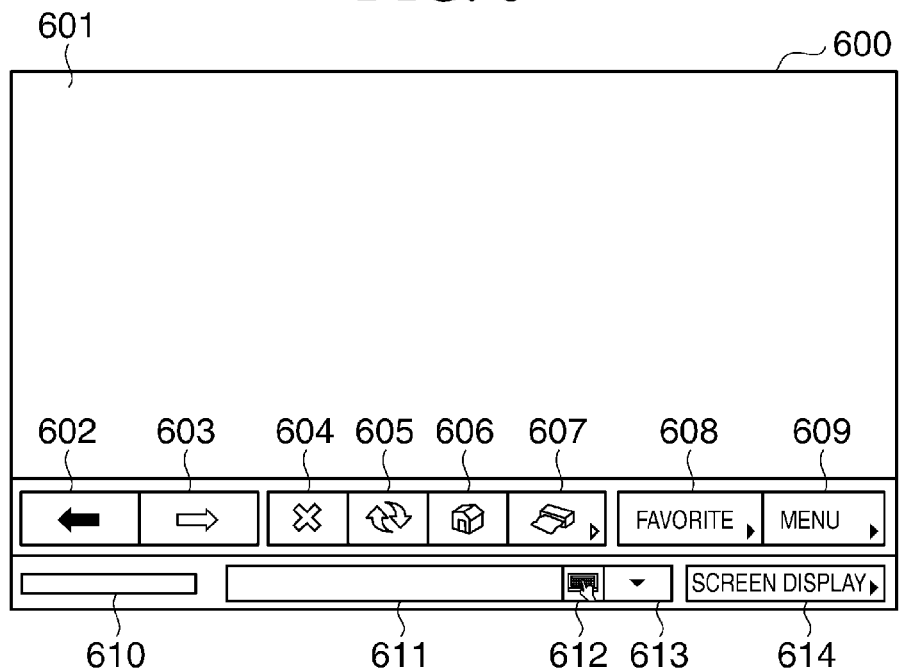
FIG. 6 is a view showing an example basic screen in a WEB browsing mode of the MFP.

Next, a basic screen 600 in the WEB browsing mode is described with reference to FIG. 6. FIG. 6 shows an example basic screen in the WEB browsing mode of the MFP 100.

Reference numeral 601 denotes a page drawing area for displaying a web page received and developed by the web browser. Buttons 602, 603 are for displaying already received web pages in the order of reception. A button 604 is a cancel button for stopping reception of a web page which is being received. A button 605 is an update button for inquiring the web server 180 about the latest version of a currently displayed web page and for acquiring and developing the latest version web page. A button 606 is for starting reception of a web page, which has been registered by a user as a homepage.

A button 607 is a print button. A currently displayed web page can be printed by depressing the button 607. Detailed print settings can also be made, as required by the user. A button 608 is a favorite button for starting reception of a web page registered by the user. Specifically, a list of titles of web pages registered by the user is displayed by selecting the button 608, and upon selection of a desired title by the user, reception of the corresponding web page is started. A button 609 is a menu button for changing web browser settings.

Reference numeral 610 denotes a progress bar for displaying the progress of web page reception. Reference numeral 611 denotes a URL display area for displaying the URL of the received web page. A button 612 is a URL input button. When the button 612 is selected, a soft keyboard is displayed. The user is able to input a URL by using the displayed soft keyboard. A button 613 is a history button for displaying the history of URLs input by the user. By selecting a desired URL from the history, reception of the corresponding web page can be started. A button 614 is a screen display button for making settings for web browser screen display.

Next, with reference to FIG. 7, a description will be given of control for notifying a user of information on processing which is being performed by a processing unit (e.g., the scanner unit 130 or the printer unit 140) provided in the MFP 100. It should be noted that the processing information represents, e.g., the progress of a job, a processing result of a job, or a state of the scanner unit 130 or the printer unit 140 (hereinafter, collectively referred to as the progress).

Figure 7:
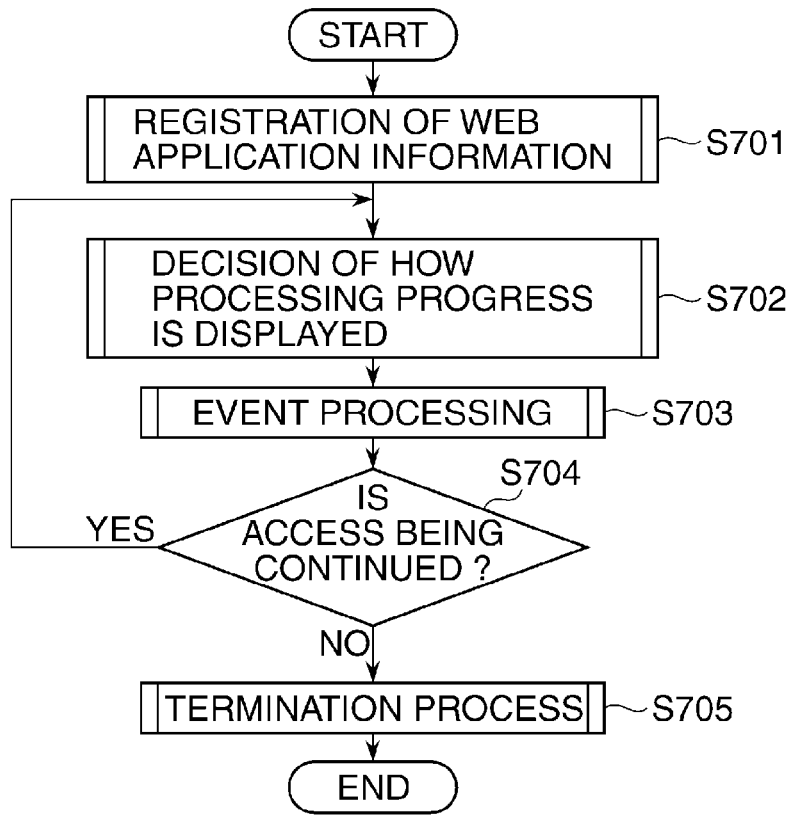
FIG. 7 is a flowchart showing the procedures of processing executed by the MFP.

FIG. 7 shows in flowchart the procedures of processing executed by the MFP 100. The below-described processing is overall controlled by the CPU 111.

In step S701, the CPU 111 registers identification information for an access destination web application. The identification information to be registered is, e.g., an IP address of a web server on which the web application is provided. Alternatively, the identification information may be an URL for use in accessing the web application.

In step S702, the CPU 111 decides how the progress is displayed. In step S703, the CPU 111 executes processing on an event notified from the processing unit provided in the MFP 100 during execution of or after completion of processing on a job by the processing unit. The term "processing unit" indicates, e.g., the scanner unit 130 or the printer unit 140.

In step S704, the CPU 111 determines whether or not access to the web application is being continued. When determining that access is being continued, the CPU 111 returns to step S702. On the other hand, when determining that the access is completed, the CPU 111 proceeds to step S705 to execute a termination process, whereupon the process shown in FIG. 7 is completed.

Figure 8:
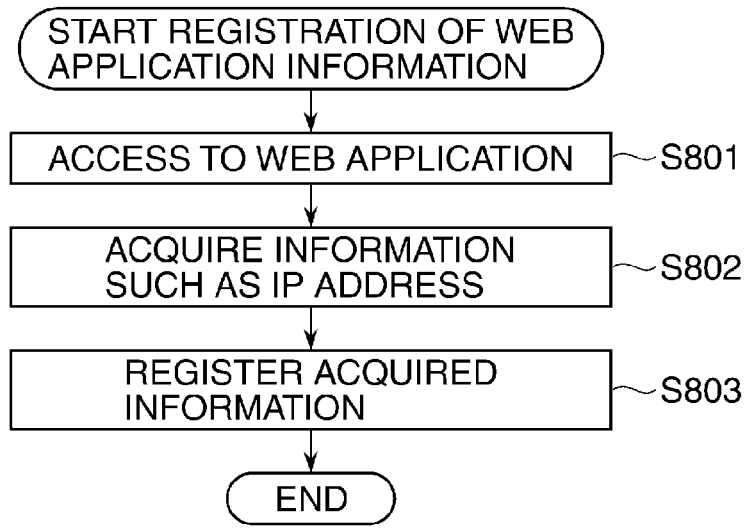
FIG. 8 is a flowchart showing the procedures of processing performed in step S701 in FIG. 7.

In the following, respective steps performed in the flowchart of FIG. 7 are described in detail with reference to FIGS. 8 to 14. FIG. 8 shows in flowchart the procedures of processing performed in step S701 of FIG. 7.

In step S801, the CPU 111 accesses the web application. In step S802, the CPU 111 acquires identification information for identifying the access destination web application (e.g., the IP address of the web server). In step S803, the CPU 111 registers the identification information acquired in step S802 into a storage unit such as the RAM 112, HDD 114, or memory 117.

Figures 9, 10:
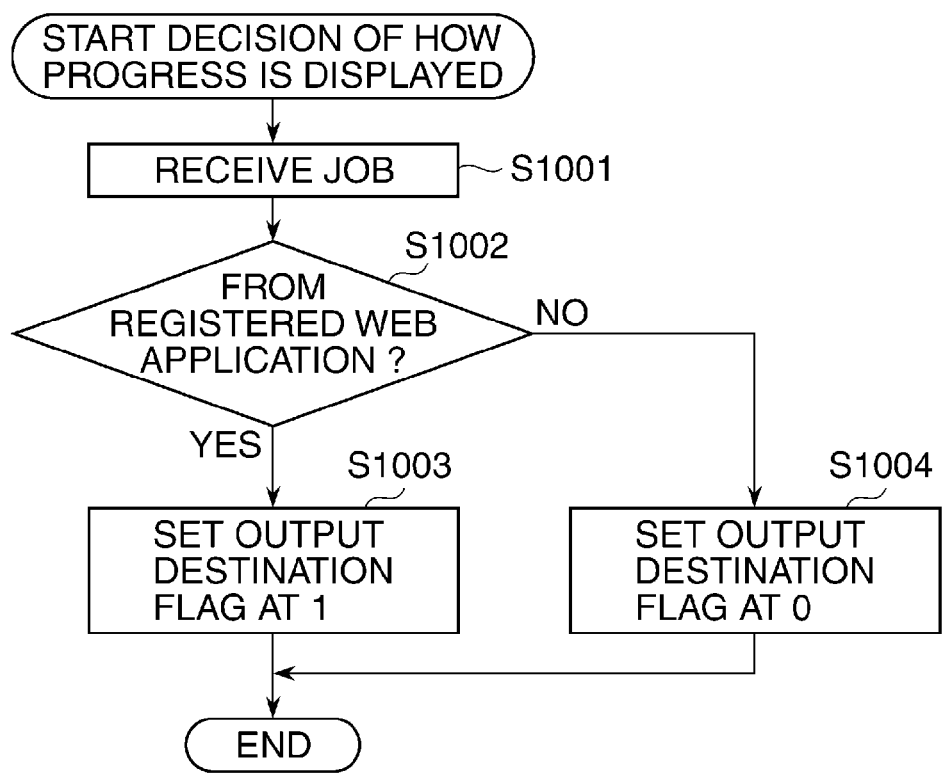
FIG. 9 is a view showing an example of web application identification information.
FIG. 10 is a flowchart showing the procedures of processing performed in step S702 in FIG. 7.

FIG. 9 shows an example of web application identification information in this embodiment. In this example, IP addresses are registered as network addresses. Alternatively, URLs can be registered. Information other than network addresses can also be registered. In the example of FIG. 9, a plurality of network addresses are registered. Such registration of plural network addresses is made, e.g., when the user accesses a plurality of web applications by using a tab function of the web browser. In that case, the processing in step S701 is executed once for each tab.

FIG. 10 shows in flowchart the procedures of processing performed in step S702 in FIG. 7.

In step S1001, the CPU 111 receives a job which is to be processed by the processing unit of the MFP 100. In step S1002, the CPU 111 determines whether the received job is one for which a request for processing has been given by a web application corresponding to the identification information registered in step S803. Based on a result of this determination, how the progress is to be displayed is decided in the following steps.

A job for which a request for processing has not been given by a web application corresponding to the registered identification information is, e.g., a job for which a request for processing has been given by a local application provided on the RAM 112 of the MFP 100, or a job for which a request for processing has been given by an application other than the web applications corresponding to the registered identification information.

If the received job is a job for which a request for processing has been given by a web application corresponding to the identification information registered in step S803, the CPU 111 proceeds to step S1003 in which an output destination flag held by the control unit 110 is set at a value of 1.

If, on the other hand, the received job is not one for which a request for processing has been given by a web application corresponding to the identification information registered in step S803, the CPU 111 proceeds to step S1004 in which the output destination flag is set at 0. It should be noted that the output destination flag is stored into a storage unit such as the HDD 114 or the memory 117.

Figure 11:
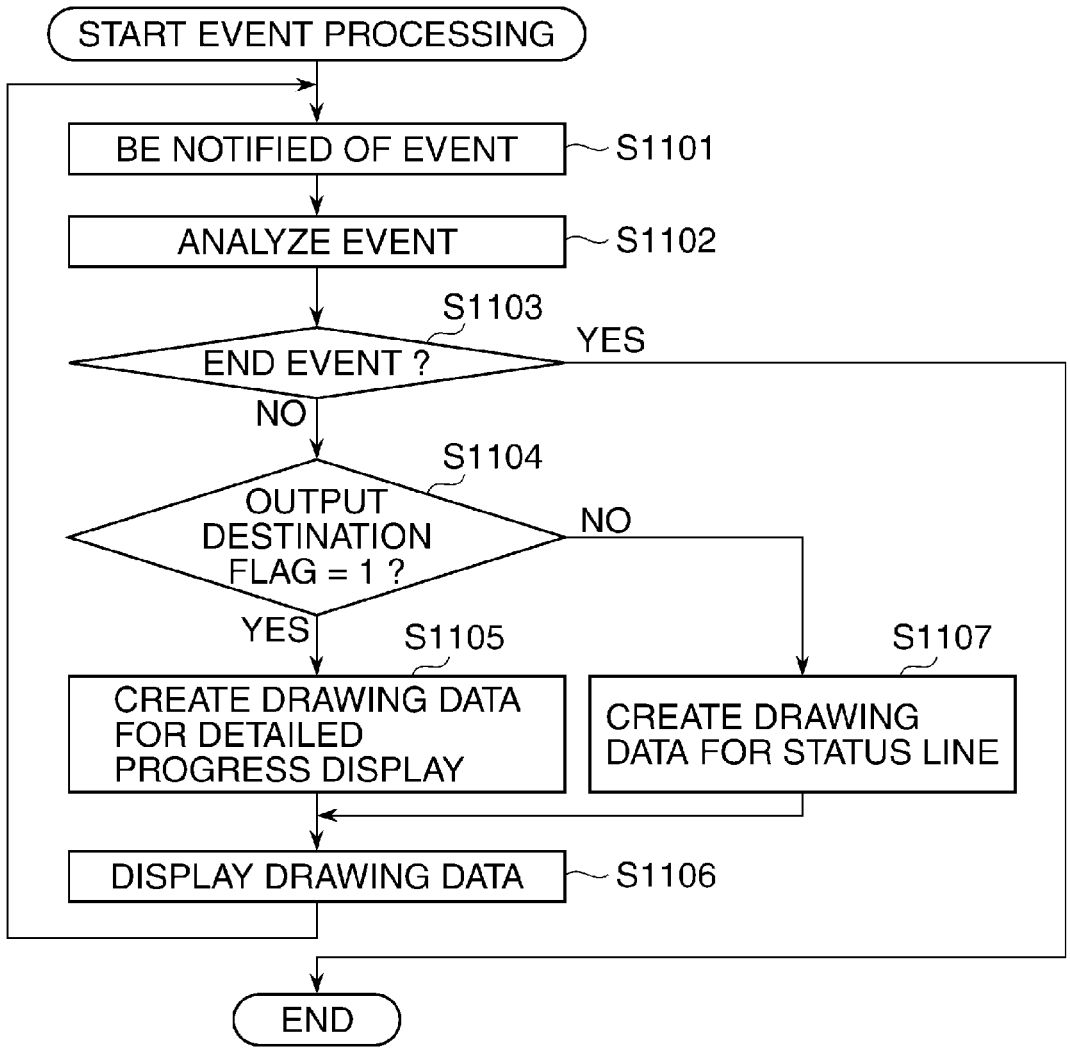
FIG. 11 is a flowchart showing the procedures of processing performed in step S703 in FIG. 7.

FIG. 11 shows in flowchart the procedures of processing performed in step S703 in FIG. 7.

If, in step S1101, an event is notified from the processing unit while a job is being processed, the CPU 111 analyzes the content of the notified event in step S1102. In the next step S1103, based on a result of the analysis, the CPU 111 determines whether the notified event is an end event. If the notified event is an end event, the present processing is completed.

On the other hand, if the notified event is not an end event, the CPU 111 proceeds to step S1104 to refer to the output destination flag set in step S1003 and determine whether the flag has a value of 1. If the output destination flag has a value of 1, the CPU 111 proceeds to step S1105 to create drawing data for detailed progress display. On the other hand, if the flag does not have a value of 1, the CPU 111 proceeds to step S1107 to create drawing data for simplified progress display. In step S1106, the CPU 111 causes the operation unit 150 to display the drawing data created in step S1105 or S1107.

The drawing data for detailed progress display is one in accordance with which details of the progress are displayed on the entirety of the screen shown in FIG. 6. On the other hand, the drawing data for simplified progress display is one in accordance with which the progress is displayed on a portion of the screen shown in FIG. 6 (e.g., a status display line provided in a lower end area of the screen).

It should be noted that when using the drawing data for detailed progress display, it is unnecessary to display the progress over the entirety of the screen shown in FIG. 6, insofar as the progress display area is larger than that based on the drawing data for simplified progress display.

The progress display area may be the same between when the drawing data for detailed progress display is used and when the drawing data for simplified progress display is used. In that case, the drawing data for detailed progress display contains detailed information, whereas the drawing data for simplified progress display contains lesser information.

It should be noted that when using the drawing data for detailed progress display, it is possible to clearly indicate that the progress relates to a job, which is being executed in response to a request from the web application currently accessed by the MFP 100, whereby the user notified of the progress is able to easily identify that the notified progress relates to the processing which the user instructs.

Figure 12:
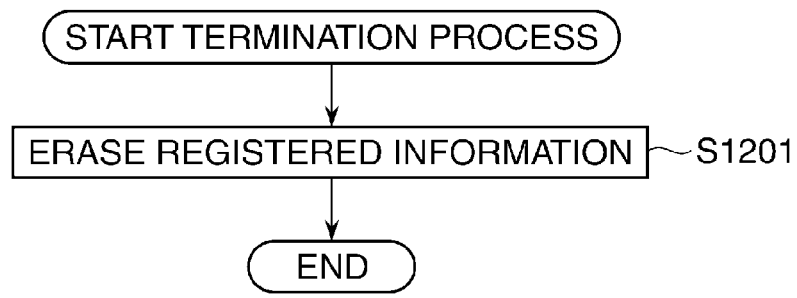
FIG. 12 is a flowchart showing the procedures of processing performed in step S705 in FIG. 7.

FIG. 12 shows in flowchart the procedures of processing performed in step S705 in FIG. 7. In step S1201, the CPU 111 erases the identification information registered in step S803.

Figure 13:
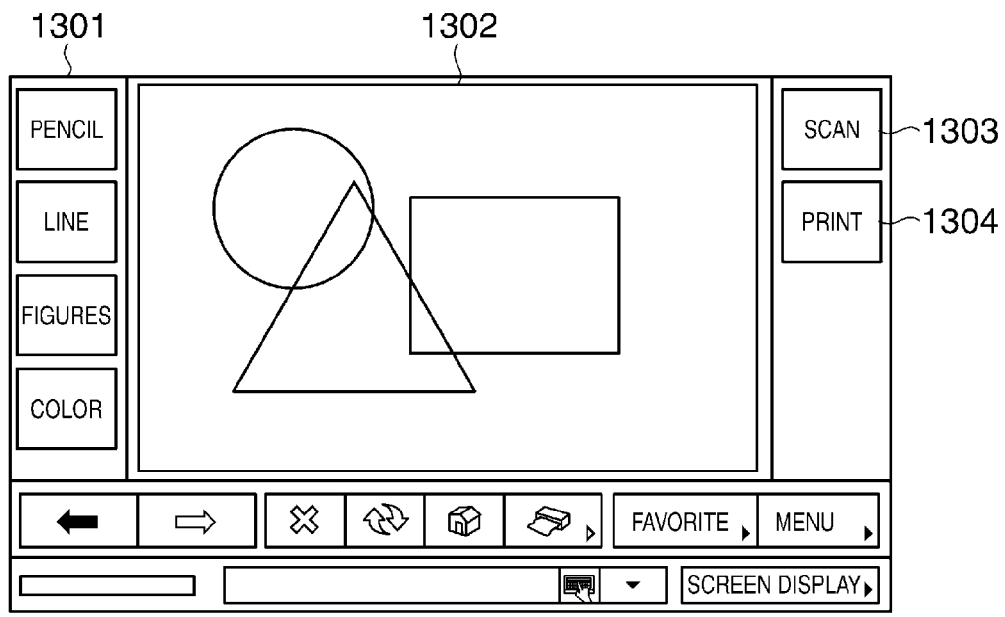
FIG. 13 is a view showing an example web application.

FIG. 13 shows an example web application. The application in this example is a retouching application, in which various tools in a tool selection field 1301 can be selected to edit an image developed in an image edit field 1302.

Reference numerals 1303, 1304 respectively denote a scan button and a print button. When the scan button 1303 is depressed, a job for causing the scanner unit 130 to read an original is given to the MFP 100. When the print button 1304 is depressed, a job for causing the printer unit 140 to output read image data is given to the MFP 100. Received image data can be developed and edited on the image edit field 1302, and an image on the image edit field 1302 can be printed out.

Figure 14:
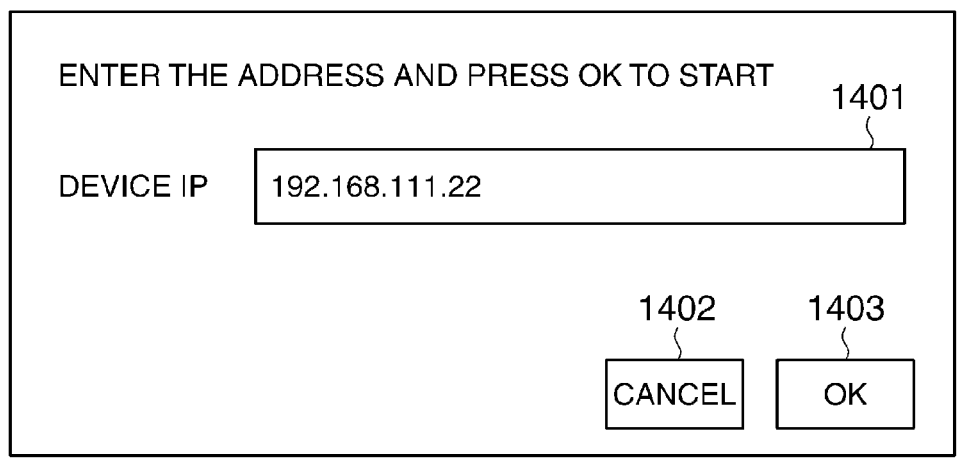
FIG. 14 is a view showing an example scan/print start screen.
Figure 15:
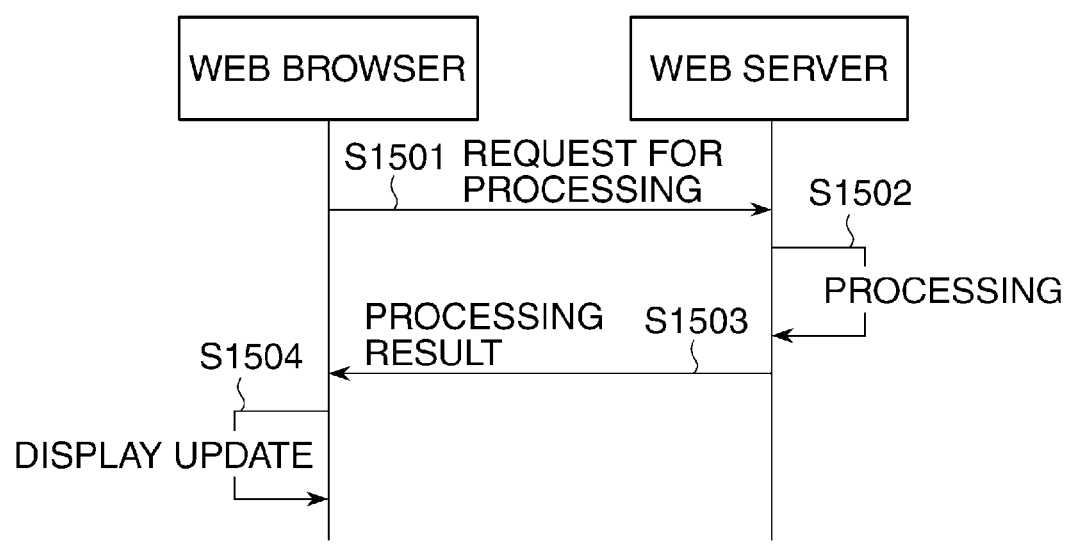
FIG. 15 is a sequence diagram showing example procedures of processing executed by a web browser and a web server in a case where a web application on the web server is utilized via the web browser.
Figure 16:
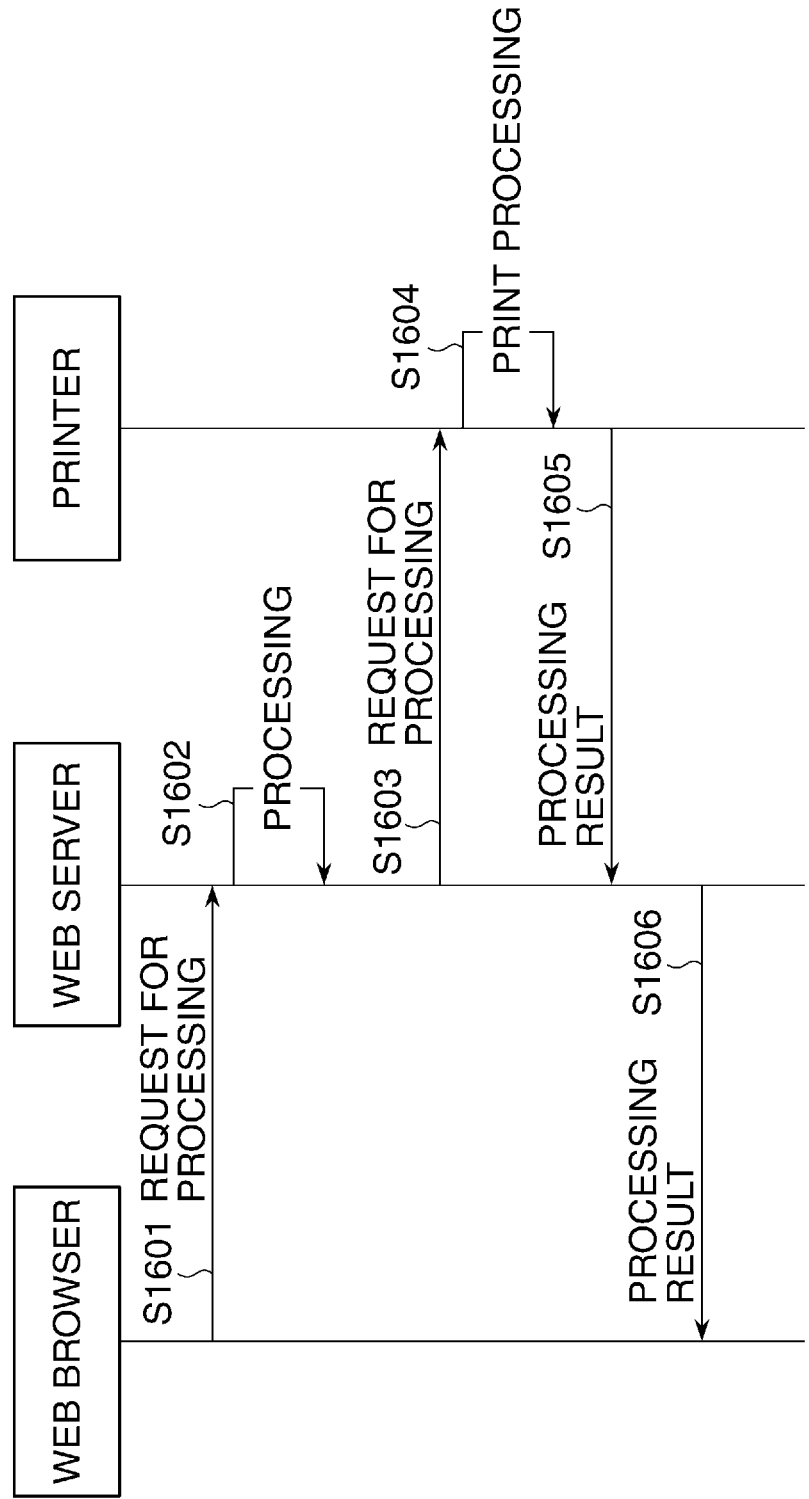
FIG. 16 is a sequence diagram showing example procedures of processing executed by a web application when the web application requests a printer to execute processing.
Figure 17:
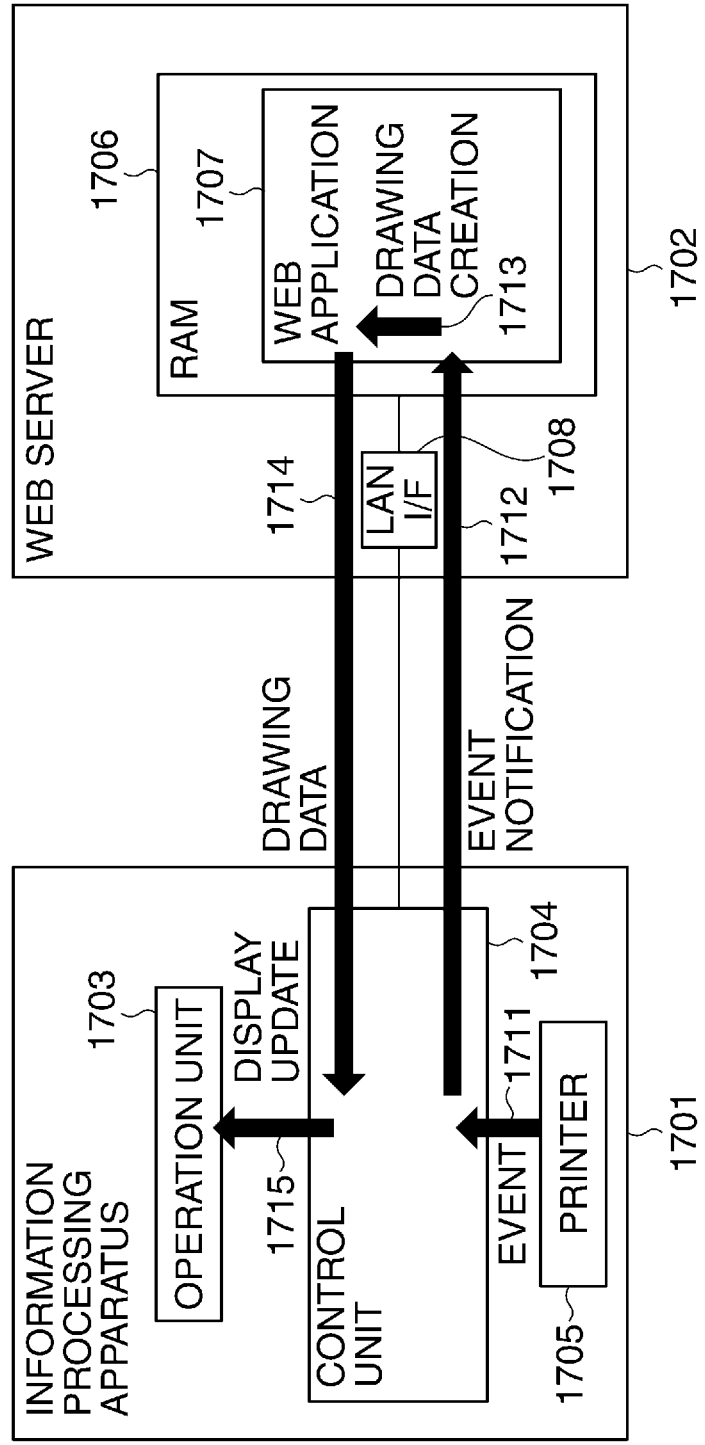
FIG. 17 is a view for explaining control of processing progress display in an information processing apparatus having therein both a web browser and a printer which is utilized by a web application.

FIG. 14 shows an example scan/print start screen. The screen shown in FIG. 14 is an example screen, which is displayed by the web browser when the scan button 1303 or the print button 1304 in FIG. 13 is depressed.

On the screen, there is displayed a field 1401, e.g., a device IP address setting field, in which network information, such as an ID address of the MFP 100 which is a processing request destination, can be set. The network information on the MFP currently accessing the web application can be displayed, the network information being input in advance as a default value. When a cancel button 1402 is selected, processing is stopped and the screen is returned to the screen shown in FIG. 13. When a decision button 1403 is selected, the unit corresponding to the field 1401 is requested to execute processing.

In the above example, the progress is displayed by using the drawing data for detailed progress display when the output destination flag has a value of 1, whereas the progress is displayed by using the drawing data for simplified progress display when the output destination flag has a value other than 1. Alternatively, the progress may be displayed by using drawing data only when the output destination flag has a value of 1, whereas the progress may not be displayed when the output destination flag has a value other than 1.

As described above, the information processing apparatus of this embodiment accesses a web application, registers identification information for the web application, and determines whether processing to be executed by the processing unit is one executed in response to a request from a web application corresponding to any of registered identification information. Then, a notification method to notify information on processing having been or being executed by the processing unit is made different depending on whether it is determined that the processing to be executed by the processing unit is one executed in response to a request from a web application corresponding to any of the registered identification information. Alternatively, in a case where it is determined that the processing to be executed by the processing unit is one executed in response to a request from a web application corresponding to any of the registered identification information, the information on the processing is notified. Otherwise, the information on the processing is not notified.

In a first concrete example of the notification, in a case where it is determined that the processing to be executed by the processing unit is one executed in response to a request from a web application corresponding to any of the registered identification information, the information on the processing having been or being executed by the processing unit is notified in detail. On the other hand, in a case where it is determined that the processing to be executed by the processing unit is one executed in response to a request from a local application without intervention of any of web applications provided on the web server, the information on the processing having been or being executed by the processing unit is briefly notified.

In a second concrete example, in a case where it is determined that processing executed by the processing unit is one executed in response to a request from a web application corresponding to any of the registered identification information, information on the processing having been or being executed by the processing unit is notified in detail. On the other hand, in a case where it is determined that the processing to be executed by the processing unit is one executed in response to a request from a web application other than web applications corresponding to the registered identification information, the information on the processing having been or being executed by the processing unit is briefly notified.

In a third concrete example, in a case where it is determined that processing to be executed by the processing unit is one executed in response to a request from a web application corresponding to any of the registered identification information, information on the processing having been or being executed by the processing unit is notified. On the other hand, in a case where it is determined that the processing to be executed by the processing unit is one executed in response to a request from a local application without intervention of any of web applications provided on the web server, information on the processing having been or being executed by the processing unit is not notified.

In a fourth concrete example, in a case where it is determined that processing to be executed by the processing unit is one executed in response to a request from a web application corresponding to any of the registered identification information, information on the processing having been or being executed by the processing unit is notified. On the other hand, in a case where it is determined that the processing to be executed by the processing unit is one executed in response to a request from a web application other than web applications corresponding to the registered identification information, information on the processing having been or being executed by the processing unit is not notified.

With the information processing apparatus of the embodiment having the construction described above, it is possible to notify to the user, without the intervention of the web server, information on the processing having been or being executed by the processing unit. As a result, the information on the processing having been or being executed by the processing unit can be notified realtime, and the increase in network traffic can be prevented.

Other Embodiment

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-257785, filed Oct. 2, 2008, which is hereby incorporated by reference herein in its entirety.

What is claimed is:

1. An information processing apparatus, comprising:
a display unit configured to display information;
a processing unit configured to execute a processing in response to a request;
an access unit configured to access a web application provided on an external apparatus on a network;
a determination unit configured to determine whether a particular processing executed by the processing unit is one executed in response to a request from the web application being accessed by said access unit, or one executed in response to a request from a local application provided on the information processing apparatus;
a selection unit configured to select a detailed notification method for an occurrence of a particular event resulting from the particular processing in response to a determination by said determination unit that the particular processing executed by the processing unit is one executed in response to a request from the web application being accessed by said access unit, and to select a simple notification method for the occurrence of the particular event in response to a determination by said determination unit that the particular processing executed by the processing unit is one executed in response to a request from the local application, notification by the simple notification method being simpler than notification by the detailed notification method; and
a notification unit configured to notify, via said display unit, information on the occurrence of the particular event by the simple notification method in a case where said selecting unit selects the simple notification method, and to notify, via said display unit, the information on the occurrence of the particular event by the detailed notification method in a case where said selecting unit selects the detailed notification method.

2. The information processing apparatus according to claim 1, further comprising:
a registration unit configured to register identification information of the web application when said access unit starts to access the web application,
wherein said determination unit is configured to perform the determination based on the identification information registered by said registration unit.

3. The information processing apparatus according to claim 1, wherein the processing unit is a printing unit configured to form an image on a recording medium based on image data.

4. The information processing apparatus according to claim 2, further comprising:

an erase unit configured, in response to completion of access to the web application by said access unit, to erase a corresponding identification information registered by said registration unit.

5. The information processing apparatus according to claim 1, wherein said access unit is configured to access the web application in accordance with an instruction input via a web browser provided on the information processing apparatus.

6. The information processing apparatus according to claim 2, wherein the identification information is a URL that identifies the corresponding web application or an IP address that identifies an external apparatus on which the corresponding web application is provided.

7. A control method for an information processing apparatus including a display unit configured to display information, the method comprising:
   an execution step of a processing unit of the information processing apparatus executing a processing in response to a request;
   an access step of accessing a web application provided on the an external apparatus on a network;
   a determination step of determining whether a particular processing executed by the processing unit is one executed in response to a request from the web application being accessed in said access step, or one executed in response to a request from a local application provided on the information processing apparatus;
   a selection step of selecting a detailed notification method for an occurrence of a particular event resulting from the particular processing in response to a determination in said determination step that the particular processing executed by the processing unit is one executed in response to a request from the web application being accessed in said access step, and to select a simple notification method for the occurrence of the particular event in response to a determination in said determination step that the particular processing to be executed by the processing unit is one executed in response to a request from the local application, notification by the simple notification method being simpler than notification by the detailed notification method; and
   a notification step of notifying, via said display unit, information on the occurrence of the particular event by the simple notification method in a case where the simple notification method is selected in said selecting step, and to notify, via said display unit, the information on the occurrence of the particular event by the detailed notification method in a case where the detailed notification method is selected in said selecting step.

8. A non-transitory computer-readable storage medium storing a program for causing at least a computer to execute a control method for an information processing apparatus including a display unit configured to display information, the method comprising:
   an execution step of a processing unit of the information processing apparatus executing a processing in response to a request;
   an access step of accessing a web application provided on an external apparatus on a network;
   a determination step of determining whether a particular processing executed by the processing unit is one executed in response to a request from the web application being accessed in said access step, or one executed in response to a request from a local application provided on the information processing apparatus;
   a selection step of selecting a detailed notification method for an occurrence of a particular event resulting from the particular processing in response to a determination in said determination step that the particular processing executed by the processing unit is one executed in response to a request from the web application being accessed in said access step, and to select a simple notification method for the occurrence of the particular event in response to a determination in said determination step that the particular processing to be executed by the processing unit is one executed in response to a request from the local application, notification by the simple notification method being simpler than notification by the detailed notification method; and
   a notification step of notifying, via said display unit, information on the occurrence of the particular event by the simple notification method in a case where the simple notification method is selected in said selecting step, and to notify, via said display unit, the information on the occurrence of the particular event by the detailed notification method in a case where the detailed notification method is selected in said selecting step.

9. An information processing apparatus comprising:
   a display unit configured to display information;
   a hardware processor; and
   a memory connected to the hardware processor and storing a program executable by the hardware processor, the program comprising:
   processing instructions configured to execute a processing in response to a request;
   access instructions configured to access a web application provided on an external apparatus on a network;
   determination instructions configured to determine whether a particular processing executed according to the processing instructions is one executed in response to a request from the web application being accessed according to said access instructions, or one executed in response to a request from a local application provided on the information processing apparatus;
   selection instructions configured to select a detailed notification method for an occurrence of a particular event resulting from the particular processing in response to a determination according to said determination instructions that the particular processing to be executed according to the processing instructions is one executed in response to a request from the web application being accessed according to said access instructions, and to select a simple notification method for the occurrence of the particular event in response to a determination according to said determination instructions that the particular processing executed according to the processing instructions is one executed in response to a request from the local application, notification by the simple notification method being simpler than notification by the detailed notification method; and
   notification instructions configured to notify, via said display unit, information on the occurrence of the particular event by the simple notification method in a case where the simple notification method is selected according to said selection instructions, and to notify, via said display unit, the information on the occurrence of the particular event by the detailed notification method in a case where the detailed notification method is selected according to said selection instructions.

* * * * *